(12) United States Patent
Horimai

(10) Patent No.: US 7,369,478 B2
(45) Date of Patent: May 6, 2008

(54) OPTICAL INFORMATION RECORDING APPARATUS, OPTICAL INFORMATION REPRODUCING APPARATUS, AND OPTICAL INFORMATION RECORDING/REPRODUCING APPARATUS

(75) Inventor: Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 492 days.

(21) Appl. No.: 10/844,109

(22) Filed: May 12, 2004

(65) Prior Publication Data
US 2005/0083799 A1   Apr. 21, 2005

(30) Foreign Application Priority Data
May 13, 2003  (JP)  ............................. 2003-171393
May 12, 2004  (JP)  ............................. 2004-142258

(51) Int. Cl.
*G11B 7/00* (2006.01)
(52) U.S. Cl. .................... 369/103; 369/112.26
(58) Field of Classification Search ................. 369/103
See application file for complete search history.

(56) References Cited
U.S. PATENT DOCUMENTS
7,002,891 B2 *  2/2006  Horimai ..................... 369/103
2004/0184382 A1 *  9/2004  Horimai et al. ............. 369/103

FOREIGN PATENT DOCUMENTS
JP           11-311938         11/1999

* cited by examiner

*Primary Examiner*—Thang V. Tran
*Assistant Examiner*—Lixi Chow
(74) *Attorney, Agent, or Firm*—William L. Androlia; H. Henry Koda

(57) ABSTRACT

An object is to lighten a pickup and reduce the size of a driving device and, as a result, to reduce the size of an optical information recording apparatus, an optical information reproducing apparatus and an optical information recording/reproducing apparatus, and to improve the transfer rate by enabling to make an access to the optical information recording medium at a high speed. In an optical information recording apparatus using holography, having: a light source 32, an information expressing device 63 for generating information light by adding information to light from the light source; a reference light generator 65 for generating reference light from the light from the light source; and an objective lens 70 for irradiating the information light and the reference light onto an optical information recording medium 1, the apparatus comprises a fixed unit 73 including at least the information expressing device 63 and a moving unit 75 including at least the objective lens 70, which moves for making access to a prescribed recording position of the optical information recording medium 1.

13 Claims, 7 Drawing Sheets

OPTICAL INFORMATION RECORDING APPARATUS, OPTICAL INFORMATION REPRODUCING APPARATUS, AND OPTICAL INFORMATION RECORDING/REPRODUCING APPARATUS

BACKGROUND OF THE INVENTION

1. Field of the Invention

The present invention relates to an optical information recording apparatus, optical information reproducing apparatus and an optical information recording/reproducing apparatus using holography, and specifically, to an optical information recording apparatus, an optical information reproducing apparatus and an optical information recording/reproducing apparatus in which an objective lens is moved for making access to a prescribed recording position or reproducing position of an optical information recording medium.

2. Description of the Related Art

In holographic recording for recording information onto a recording medium using holography, in general, the information light carrying image information and reference light are overlapped with each other in the recording medium and the interference pattern generated thereby is written onto the recording medium. For reproducing the recorded information, reference light is irradiated to the recording medium for diffracting the interference pattern so as to reproduce the image information.

The information light carrying the image information is generated by spatially modulating the intensity or the phase of the light. For example, Japanese Unexamined Patent Publication No. 11-311938 mentions holographic recording and modulation of light. In Japanese Unexamined Patent Publication No. 11-311938 (paragraph [0024]), it is noted that a liquid crystal device can be used as a spatial light modulator for spatially modulating light. Also, it is considered possible to use a DMD (digital micro mirror device) as a spatial light modulator for spatially modulating light. A DVD can modulate the intensity of incoming light by changing the reflection direction by each pixel and modulate the phase of the incoming light by changing the reflection position by each pixel.

However, when the pitch of pixels in the spatial light modulator is reduced for increasing the amount of information to be carried by the information light, a kind of diffraction grating is formed due to minute pixels of the spatial light modulator. Therefore, redundant diffraction light is also emitted from the spatial light modulator. If such diffraction light is also used as the information light, holography necessary for recording information becomes too large and the recording capacity of the recording medium is decreased. Thus, it is possible to prevent the holography from becoming too large by shielding the diffraction light.

However, when the diffraction light is shielded, the information light becomes dark by shielding light. Thus, efficiency of being able to use the information light becomes low.

As described, when the information is spatially modulated by minute pixels, it becomes necessary to deal with the diffraction light.

A prior application (Japanese Patent Application laid-open 2003-29968) discloses an optical information recording apparatus and optical information recording/reproducing apparatus in which diffraction light can be dealt with while suppressing a decrease in recording capacity of a recording medium and deterioration of efficiency for using the information light.

First, the optical information recording apparatus and the optical information reproducing apparatus of the prior application will be described.

FIG. 3 is an explanatory figure showing the configuration of the optical information recording/reproducing apparatus of the prior application. The optical information recording/reproducing apparatus includes an optical information recording apparatus and an optical information reproducing apparatus.

An optical information recording medium 1 used in the optical information recording/reproducing apparatus shown in FIG. 3 is formed by laminating a hologram recording layer 3 as an information recording layer to which information is recorded utilizing volume holography, a reflector film 5, a substrate (protective layer) 8 in this order on one face of a disk-type transparent substrate 2 formed with polycarbonate or the like.

The hologram recording layer 3 is formed with a hologram material in which the optical properties such as the refractive index, dielectric constant, reflectance and the like change according to the intensity of a laser beam when being irradiated by the laser beam for a prescribed length of time. For example, photopolymers HRF-600 (name of the product), the products of Dupont, or the like can be used as the hologram material.

The reflector film 5 is a film for reflecting light (reproduction-specific reference light and the like), and the reflector film 5 is formed with, for example aluminum.

The substrate (protective layer) 8 is a substrate with address formed by, for example, injection. In the substrate (protective layer) 8, an address servo area and a data area (not shown) are provided. By using the address servo area, irradiating position of light in the optical information recording medium 1 can be servo-controlled. Also, in the data area, information to be recorded in the optical information recording medium 1 can be recorded by means of holography.

A pickup 11 irradiates reference light and information light onto the optical information recording medium 1 and receives reproduction light from the optical information recording medium 1. The pickup 11 comprises an objective lens 12, an actuator 13, a quarter-wave plate 14, a half mirror 26, convex lenses 27a, 27b, an optical detector 28, a laser light source 32, a collimator lens 34, a half-wave plate 35, a polarization beam splitter 36, a mirror 38, a spatial light modulator (information expressing device) 40, a shutter 42, a convex lenses 44a, 44b, a diaphragm 46, a half-wave plate 48, a half mirror 50, a mirror 52, a mirror 54 and a convex lens 56.

The information light is the light to which information to be recorded is added. In FIG. 3, the information light is obtained by modulating the laser light generated by the laser light source 32 by the spatial light modulator 40 and is irradiated onto the optical information recording medium 1. The refraction light generated by the minute pixels of the spatial light modulator 40 also carries information, however, it is referred to as the refraction light as being discriminated from the information light in this specification.

As the reference light, there is recording-specific reference light for forming holography by being interfered with the information light and reproduction-specific reference light for reproducing information from the holography. Further, the reproduction light is the light returned from the optical information recording medium 1 to the pickup 11 when the reproduction-specific reference light enters the optical information recording medium 1. The reproduction light carries the information reproduced form the optical information recording medium 1.

The objective lens 12 is positioned on the transparent substrate 2 side of the optical information recording medium 1. The reference light and the information light enter the optical information recording medium 1 after transmitting through the objective lens 12. The reproduction light from the optical information recording medium 1 transmits through the objective lens 12 and proceeds towards the half mirror 26.

The actuator 13 is for moving the objective lens 12 in the thickness direction and the radial direction of the optical information recording medium 1.

The quarter-wave plate 14 converts the transmitted light from the linear polarization to circular polarization when the linear polarization light such as P-polarization or S-polarization enters and the angle of the direction of the linear polarization is 45° with respect to the optical axis of the crystal in the quarter-wave plate 14.

The information light is P-polarization and is converted to circular polarization after passing the quarter-wave plate 14, and enters the optical information recording medium 1. The reproduction light is circular polarization and is converted to S-polarization after passing the quarter-wave plate 14, and reaches the optical detector 28 through the convex lenses 27a, 27b.

The half mirror 26 allows the information light to transmit and directs it to the quarter-wave plate 14, while reflecting the reproduction light and directs it to the convex lenses 27a, 27b. These convex lenses 27a, 27b, upon receiving the reproduction light, direct it to enter the optical detector 28. Further, the optical detector 28 receives and detects the reproduction light. Thereby, the information recorded in the optical information recording medium 1 can be reproduced.

The laser light source 32 is for generating the laser light. The laser light becomes the base for the information light and the reference light. The collimator lens 34 converts the laser light into parallel light rays upon receiving it from the laser light source 32. The half-wave plate 35 converts the parallel light rays from P-polarization to S-polarization upon receiving them from the collimator lens 34. The polarization beam splitter 36, upon receiving the P-polarization and the S-polarization from the half-wave-plate 35, allows the P-polarization to transmit through and reflects the S-polarization. The transmitted P-polarization proceeds towards the mirror 38 and the reflected S-polarization proceeds towards the convex lens 44a. The P-polarization becomes the base for the information light and the S-polarization becomes the base for the reference light. The mirror 38, upon receiving the P-polarization, reflects it towards the spatial light modulator 40.

The spatial light modulator (information expressing device) 40 generates the information light by reflecting the P-polarization upon receiving it from the mirror 38. The generated information light transmits through the shutter 42 and the polarization beam splitter 36, and proceeds towards the convex lens 44a. The diffraction light is also emitted from the spatial light modulator 40.

The shutter 42 is open when information is recorded in the optical information recording medium 1 and closed when information is reproduced from the optical information recording medium 1 (see FIG. 4). The convex lens 44a builds an image on the diaphragm 46 upon receiving the information light and the diffraction light from the spatial light modulator 40. At this time, the information light and the diffraction light near the optical axis passes through a hole 46a of the diaphragm 46. However, the diffraction light distant from the optical axis cannot pass through the diaphragm 46. The distance between the convex lens 44a and the diaphragm 46=distance between the convex lens 44b and the diaphragm 46=distance between the spatial light modulator 40 and the convex lens 44a=distance between the convex lens 44b and the mirror 52=f=focal distance. The half-wave plate 48 converts the S-polarization reflected by the polarization beam splitter 36 into the P-polarization. This becomes the reference light.

The half mirror 50 reflects the information light and directs it to the half mirror 26 while allowing the reference light to transmit and directs it towards the mirror 52. The mirror 52 reflects the reference light towards the mirror 54 which faces the optical information recording medium 1. The mirror 54 reflects the reference light and directs it towards the convex lens 56. The convex lens 56 diffracts the reference light so as to focus it onto a position in front of the optical information recording medium 1.

In the above-described configuration, when recording operation information about recording/reproduction of the optical information to the optical information recording medium 1, the laser light generated by the laser light source 32 transmits through the collimator lens 34, the half-wave plate 35, the polarization beam splitter 36, is reflected by the mirror 38, and proceeds to the spatial light modulator 40. Then, the laser light becomes the information light by the spatial light modulator 40, which then passes through the shutter 42, the polarization beam splitter 36, the convex lens 44a, the diaphragm 46, the convex lens 44b, the half-wave plate 48, is reflected by the half mirror 50, transmits through the quarter-wave plate 14, and proceeds towards the objective lens 12. The optical elements from the spatial light modulator 40 to the objective lens 12 (the convex lens 44a, the diaphragm 46, the convex lens 44b, the half-wave plate 48, the half mirror 50 and the like) correspond to an information light obtaining means for obtaining the information light from the spatial light modulator 40.

The laser light generated by the laser light source 32 becomes the recording-specific reference light after transmitting through the collimator lens 34, the half-wave plate 35 and then being reflected by the polarization beam splitter 36. The recording-specific reference light passes through the convex lens 44a, the diaphragm 46, the convex lens 44b, the half-wave plate 48, the half mirror 50, is reflected by the mirrors 52, 54, and is diffracted by the convex lens 56 to be heading towards the objective lens 12.

The objective lens (holography forming device) 12 forms holography through making the information light interfere with the recording-specific reference light in the hologram recording layer 3 of the optical information recording medium 1.

When reproducing information from the optical information recording medium 1, as shown in FIG. 4, the laser light generated by the laser light source 32 becomes the reproduction-specific reference light after transmitting through the collimator lens 34, the half-wave plate 35, and being reflected by the polarization beam splitter 36. The reproduction-specific reference light passes through the convex lens 44a, the diaphragm 46, the convex lens 44b, the half-wave plate 48, the half mirror 50, is reflected by the mirrors 52, 54 and is diffracted by the convex lens 56 to be heading towards the objective lens 12.

The objective lens (reproduction-specific reference light irradiating device) 12 diffracts the reproduction-specific reference light and irradiates it to the hologram recording layer 3. Thereby, the reproduction light carrying the information as the subject of reproduction is generated from the hologram recording layer 3 of the optical information recording medium 1. The reproduction light transmits through the objective lens 12, the quarter-wave plate 14, is reflected by the half mirror 26, transmits through the convex lenses 27a, 27b and then is received by the optical detector 28. The optical detector 28 receives and detects the reproduction light as the incoming light and obtains the information. The objective lens 12, the quarter-wave plate 14, the half mirror 26, and the convex lenses 27a, 27b correspond to a reproduction light obtaining means for obtaining the reproduction light. The optical detector 28 corresponds to an information reproducing means for reproducing information by receiving the reproduction light. The optical detector 28 is, for example, a CMOS sensor or a CCD array sensor.

Japanese Unexamined Patent Publication No. 11-311938 (paragraph [0024])

The above-described optical information recording/reproducing apparatus disclosed in the prior application has a configuration in which the pickup 11 moves for making access to a prescribed recording position and reproducing position of the optical information recording medium. However, the pickup 11 includes the objective lens 12, and also a number of optical devices, the light sources 32 and the like so that the pickup 11 becomes heavy. Thus, the driving device for driving the pickup becomes large-scaled and, as a result, the optical information recording/reproducing apparatus also becomes large-scaled.

Also, in the optical information recording/reproducing apparatus, the pickup 11 is heavy and, due to inertia, the pickup 11 cannot be brought to make access to the optical information recording medium at a high speed, thereby decreasing the transfer rate.

In order to overcome the foregoing problems, conventionally, in a CD (compact disc) drive or a DVD (digital versatile disc) as an optical information recording/reproducing apparatus which does not use holography, the objective lens is moved in accordance with the irradiation position of the recording medium since it is only required that the optical system transfers the intensity (energy) of the light.

However, the optical system of the holographic recording irradiates the spatially modulated information light and the recording-specific reference light onto the recoding medium 1 by the objective lens for making them interfere with each other in the information recording layer 3 of the recording medium 1 for achieving recording. Thus, it is necessary to build an image of at least the information light which is spatially modulated by the spatial light modulator (information expressing device) 40 in an incident pupil surface of the objective lens 12. Also, for reproduction, it is necessary to build an image of the reproduction light generated from the information recording layer 3 of the recording medium 1 by the reproduction-specific reference light in the optical detector 28 at last.

FIGS. 5A and 5B are illustrations showing the optical system of holographic recording in which the position of the spatial light modulator (information expressing device) 40 is fixed and the position of the objective lens 12 is moved.

As shown in FIG. 5A, when recording the optical information on the outer periphery side (left side in the figure) of the optical information recording medium 1 or reproducing the optical information from the outer periphery side of the optical information recording medium 1, it is necessary that the position of the spatial light modulator 40 shown as an image surface or the optical detector 28 and the incident pupil surface of the emission pupil surface of the objective lens 12 (positions of half mirrors 50: 26 in FIG. 5A) are set to be used alternately. For building an image on both positions, it is necessary that each space between the image surface and each of a pair of lenses 44a, 44b: 27a, 27b opposing to each other, the focal point f of the convex lens, the incident pupil surface: the emission pupil surface is set to be the first focal distance f1. The terms and numerals for reproduction are mentioned after ":", following the terms and numerals for recording.

Meanwhile, as shown in FIG. 5B, when recording the optical information on the inner periphery side (right side in the figure) of the optical information recording medium 1 or reproducing the optical information from the inner periphery side of the optical information recording medium 1, it is necessary that each space between the image surface and each of a pair of lenses 44a, 44b: 27a, 27b opposing to each other, the focal point f of the convex lens, the incident pupil surface: the emission pupil surface is set to be the second focal distance f2. The movable range of the objective lens 12 and the half mirrors 50:26 is defined as D.

In order to build images in both the outer periphery side and the inner periphery side of the optical information recording medium as described by the image surface and the incident pupil surface or the emission pupil surface of the objective lens 12, the focal distance (thickness) of each of the convex lenses 44a, 44b: 27a, 27b has to be changed. Thus, the configuration in which only the objective lens is moved, which is employed in the conventional CD drive or the DVD drive, cannot be employed in holographic recording and the optical system from the image surface to the objective lens is moved as a whole.

SUMMARY OF THE INVENTION

In view of the forgoing aspects, an object of the present invention is to lighten a pickup and reduce the size of a driving device and, as a result, to reduce the size of an optical information recording apparatus, an optical information reproducing apparatus and an optical information recording/reproducing apparatus, and to improve the transfer rate by enabling to make an access to the optical information recording medium at a high speed.

Further, another object of the present invention is to provide an optical information recording apparatus, an optical information reproducing apparatus, and an optical information recording/reproducing apparatus which can perform excellent information recording or information reproduction uniformly to/from any positions of the optical information recording medium.

Furthermore, still another object of the present invention is to provide an optical information recording apparatus, an optical information reproducing apparatus, and an optical information recording/reproducing apparatus which can perform excellent information recording or information reproduction by corresponding to the rotation state such as oscillation, decentralized rotation or the like of the optical information recording medium.

In order to achieve the foregoing objects, the optical information recording apparatus of the present invention is an optical information recording apparatus using holography, having: a light source; an information expressing means for generating information light by adding information to light from the light source; a reference light generating means for generating reference light from the light from the light source; and an objective lens for irradiating the information light and the reference light onto an optical information recording medium, characterized in that the apparatus comprises: a fixed unit including at lease the information expressing means and a moving unit including at least the objective lens which moves for making access to a prescribed recording position of the optical information recording medium.

Further, in the above-described optical information recording apparatus, it is characterized in that a variable focal point optical system which is capable of building an image in a position of the information expressing means on an incident pupil surface of the movable lens.

In addition, in the above-described optical information recording apparatus, it is characterized in that the entire part of the variable focal point optical system is placed in the fixed unit.

Also, the optical information recording apparatus of the present invention is an optical information recording apparatus using holography, having: a light source; an information expressing means for generating information light by adding information to light from the light source; a reference light generating means for generating reference light from the light from the light source; and an objective lens for irradiating the information light and the reference light onto an optical information recording medium, characterized in that the apparatus comprises: a driving means for changing a distance between the information expressing means and the objective lens; and a variable focal point optical system which is capable of building an image in a position of the information expressing means on an incident pupil surface of the objective lens even when the distance between the information expressing means and the objective lens is changed by the driving means.

Further, in the above-described optical recording apparatus, it is characterized in that a servo control means for servo-controlling the variable focal point optical system according to rotation state of the optical information recording medium is provided.

Also, the optical information reproducing apparatus of the present invention is an optical information reproducing apparatus using holography, having: a light source; a reference light generating means for generating reference light from the light from the light source; and an objective lens which irradiates the reference light onto an optical information recording medium and to which reproduction light generated from the optical information recording medium enters; and an optical detector for detecting the reproduction light, characterized in that the apparatus comprises: a fixed unit including at least the optical detector; and a moving unit including at least the objective lens which moves for making access to a prescribed reproducing position of the optical information recording medium.

Further, in the above-described optical information reproducing apparatus, it is characterized in that a variable focal point optical system which is capable of building an image reproduced on an emission pupil surface of the movable objective lens in a position of the optical detector is provided.

In addition, in the above-described optical information reproducing apparatus, it is characterized in that the entire part of the variable focal point optical system is placed in the fixed unit.

Also, the optical information reproducing apparatus of the present invention is an optical information reproducing apparatus using holography, having: a light source; a reference light generating means for generating reference light from the light from the light source; and an objective lens which irradiates the reference light onto an optical information recording medium and to which reproduction light generated from the optical information recording medium enters; and an optical detector for detecting the reproduction light, characterized in that the apparatus comprises: a driving means for changing a distance between the objective lens and the optical detector; and a variable focal point optical system which is capable of building an image reproduced on an emission pupil surface of the objective lens in a position of the optical detector even when the distance between the objective lens and the optical detector is changed by the driving means.

Further, in the above-described optical information reproducing apparatus, it is characterized in that a servo control for servo-controlling the variable focal point optical system according to rotation state of the optical information recording medium is provided.

Also, the optical information recording/reproducing apparatus of the present invention is an optical information recording/reproducing apparatus using holography, having: a light source; an information expressing means for generating information light by adding information to light from the light source; a reference light generating means for generating reference light from the light from the light source; an objective lens which irradiates the information light and the reference light onto an optical information recording medium and to which reproduction light generated from the optical information recording medium enters; and an optical detector for detecting the reproduction light, characterized in that the apparatus comprises: a fixed unit including at least the information expressing means and the optical detector; and a moving unit including at least the objective lens which moves for making access to a prescribed recording position and reproducing position of the optical information recording medium.

Further, in the above-described optical information recording/reproducing apparatus, it is characterized in that: a first variable focal point optical system which is capable of building an image of an position of the information expressing means on an incident pupil surface of the movable objective lens; and a second variable focal point optical system which can build an image reproduced on an emission pupil surface of the movable objective lens in an position of the optical detector are provided.

Further, in the above-described optical information recording/reproducing apparatus, it is characterized in that the entire part of the first and second variable focal point optical systems is placed in the fixed unit.

Also, the optical information recording/reproducing apparatus of the present invention is an optical information recording/reproducing apparatus using holography, having: a light source; an information expressing means for generating information light by adding information to light from the light source; a reference light generating means for generating reference light from the light from the light source; an objective lens which irradiates the information light and the reference light onto an optical information recording medium and to which reproduction light generated from the optical information recording medium enters; and an optical detector for detecting the reproduction light, characterized in that the apparatus comprises: a driving means for changing a distance between the information expressing means and the objective lens and a distance between the optical detector and the objective lens; a first variable focal point optical system which is capable of building an image in an position of the information expressing means on an incident pupil surface of the movable objective lens even when the distance between the information expressing means and objective lens is changed by the driving means; and a second variable focal point optical system which is capable of building an image reproduced on an emission pupil surface of the objective lens in a position of the optical detector even when the distance between the objective lens and the optical detector is changed by the driving means.

Further, in the above-described optical information recording/reproducing apparatus, it is characterized in that a servo control means for servo-controlling the first and second variable focal point optical systems according to rotation state of the optical information recording medium is provided.

In addition, in the above-described optical information recording/reproducing apparatus, it is preferable that at least a part of the first and second variable focal point optical system be used in common.

EFFECTS OF THE INVENTION

The optical information recording apparatus of the present invention comprises a fixed unit including at least an information expressing device and a moving unit including at least an objective lens which moves for making access to a prescribed recording position of the optical information recording medium. Thus, the moving unit which moves for making access to the optical information recording medium can be lightened, the driving device can be reduced in size and, as a result, the optical information recording apparatus can be also reduced in size. Further, since the moving unit is light, it is possible to make access to the optical information recording medium at a high speed, thereby improving the transfer rate.

In the optical information recording apparatus, by providing the variable focal point optical system which is capable of building an image of a position of the information expressing device on the incident pupil surface of the movable objective lens, it enables to uniformly and excellently perform information recording in any positions of the optical information recording medium by the moving unit which includes at least the objective lens.

In addition, by positioning the entire part of the variable focal point optical system in the fixed unit, the moving unit can be more lightened so that it enables to further reduce the size and achieve the higher transfer rate.

Also, in the optical information recording apparatus of the present invention, by providing the driving device for changing the distance between the information recording device and the objective lens, and the variable focal point optical system which is capable of building an image in the position of the information expressing device on the incident pupil surface of the objective lens even when the distance between the information expressing device and the objective lens is changed by the driving device, the optical system from the image surface to the objective lens can be provided as separate bodies. Thus, the driving device can be reduced in size and, as a result, the optical information recording apparatus can also be reduced in size. Further, since the moving unit is light, it is possible to make access to the optical information recording medium at a high speed, thereby improving the transfer rate. In addition, it enables to uniformly and excellently perform information recording in any positions of the optical information recording medium.

The optical information reproducing apparatus of the present invention comprises a fixed unit including at least an optical detector and a moving unit including at least an objective lens which moves for making access to a prescribed reproducing position of the optical information recording medium. Thus, the moving unit which moves for making access to the optical information recording medium can be lightened, the driving device can be reduced in size and, as a result, the optical information reproducing apparatus can be also reduced in size. Further, since the moving unit is light, it is possible to make access to the optical information recording medium at a high speed, thereby improving the transfer rate.

In the optical information reproducing apparatus, by providing the variable focal point optical system capable of building an image reproduced on the emission pupil surface of the movable objective lens in the position of the optical detector, it enables to uniformly and excellently perform information reproduction from any positions of the optical information recording medium by the moving unit which includes the objective lens.

In addition, by positioning the entire part of the variable focal point optical system in the fixed unit, the moving unit can be more lightened so that it enables to further reduce the size and achieve the higher transfer rate.

Also, in the optical information reproducing apparatus of the present invention, by providing the driving device for changing the distance between the optical detector and the objective lens, and the variable focal point optical system which is capable of building an image reproduced on the emission pupil surface of the objective lens in the position of the optical detector even when the distance between the objective lens and the optical detector is changed by the driving device, the optical system from the image surface to the objective lens can be provided as separate bodies. Thus, the driving device can be reduced in size and, as a result, the optical information reproducing apparatus can also be reduced in size. Further, since the moving unit is light, it is possible to make access to the optical information recording medium at a high speed, thereby improving the transfer rate. In addition, it enables to uniformly and excellently perform information reproduction from any positions of the optical information recording medium.

Further, in the optical information recording/reproducing apparatus, by providing the same configuration as that of the above-described optical information recording apparatus and the optical information reproducing apparatus, the same effects can be obtained.

Furthermore, in the optical information recording/reproducing apparatus of the present invention, it is preferable that at least a part of the first and second variable focal point optical systems be used in common so that the optical information recording/reproducing apparatus can be reduced in size as a whole.

Further, with the present invention, it is possible to perform excellent information recording or information reproduction by adjusting the positions of the half mirror and each lens for corresponding to the rotation state such as oscillation, decentralized rotation and the like of the optical information recording medium through performing a servo control.

BRIEF DESCRIPTION OF THE DRAWEINGS

DETAILED DESCRIPTION OF THE PREFERRED EMBODIMENT

Figure 1:
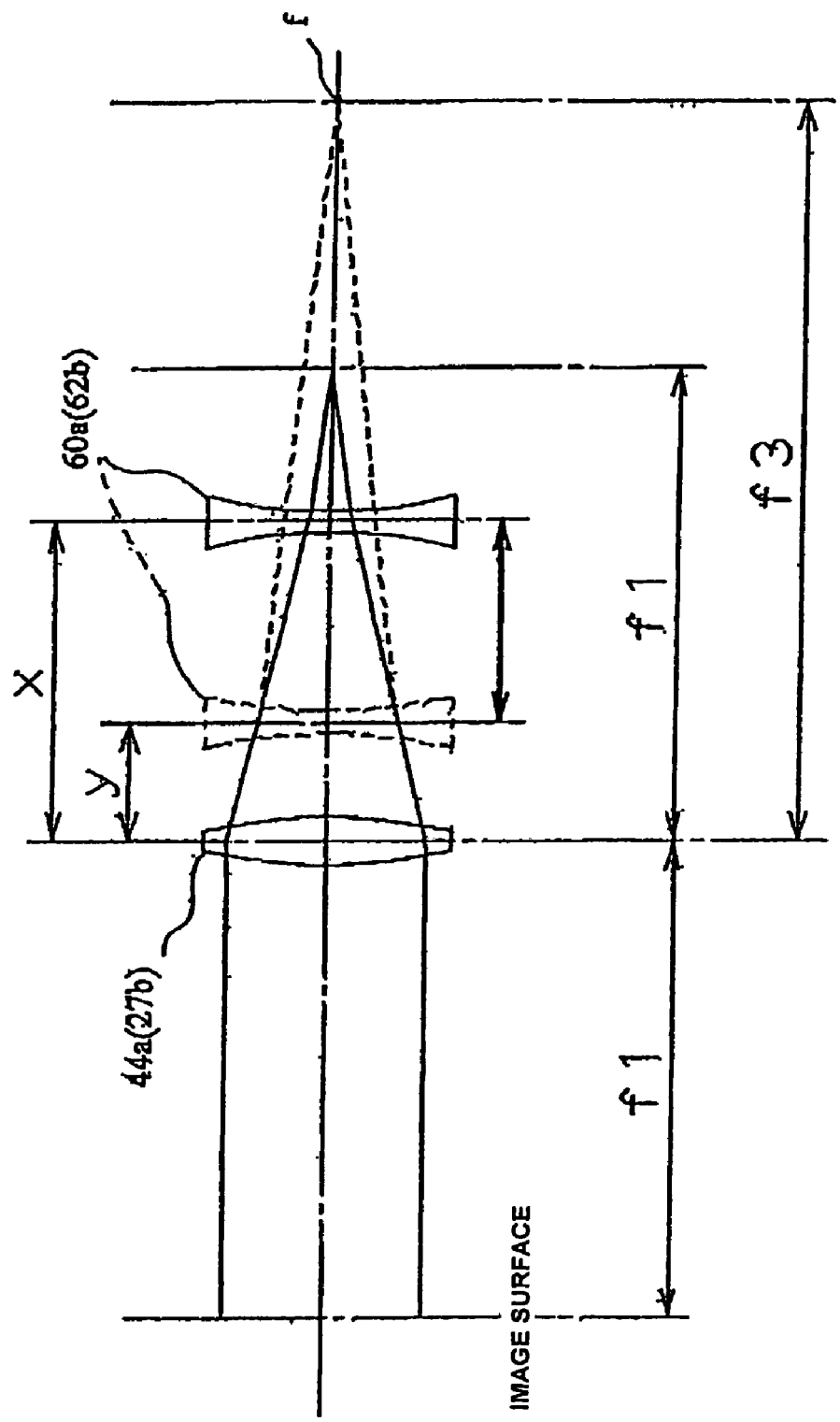
FIG. 1 is an illustration showing an embodiment of a variable focal point optical system.
Figure 2:
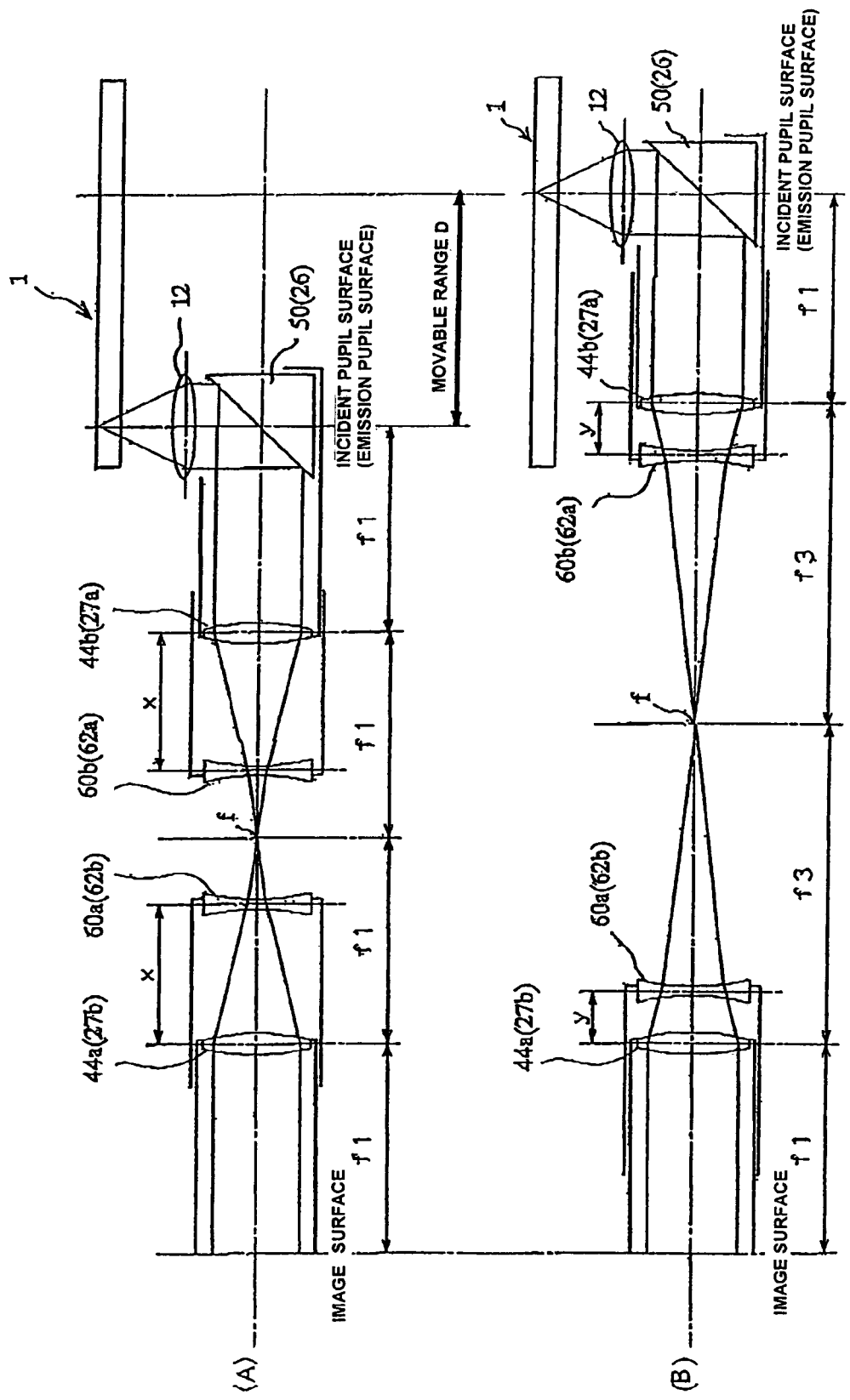
FIG. 2A is an illustration showing the variable focal point optical system of FIG. 1 on the outer periphery side of an optical information recording medium.
FIG. 2B is an illustration showing the variable focal point optical system on the inner periphery side.
Figure 5:
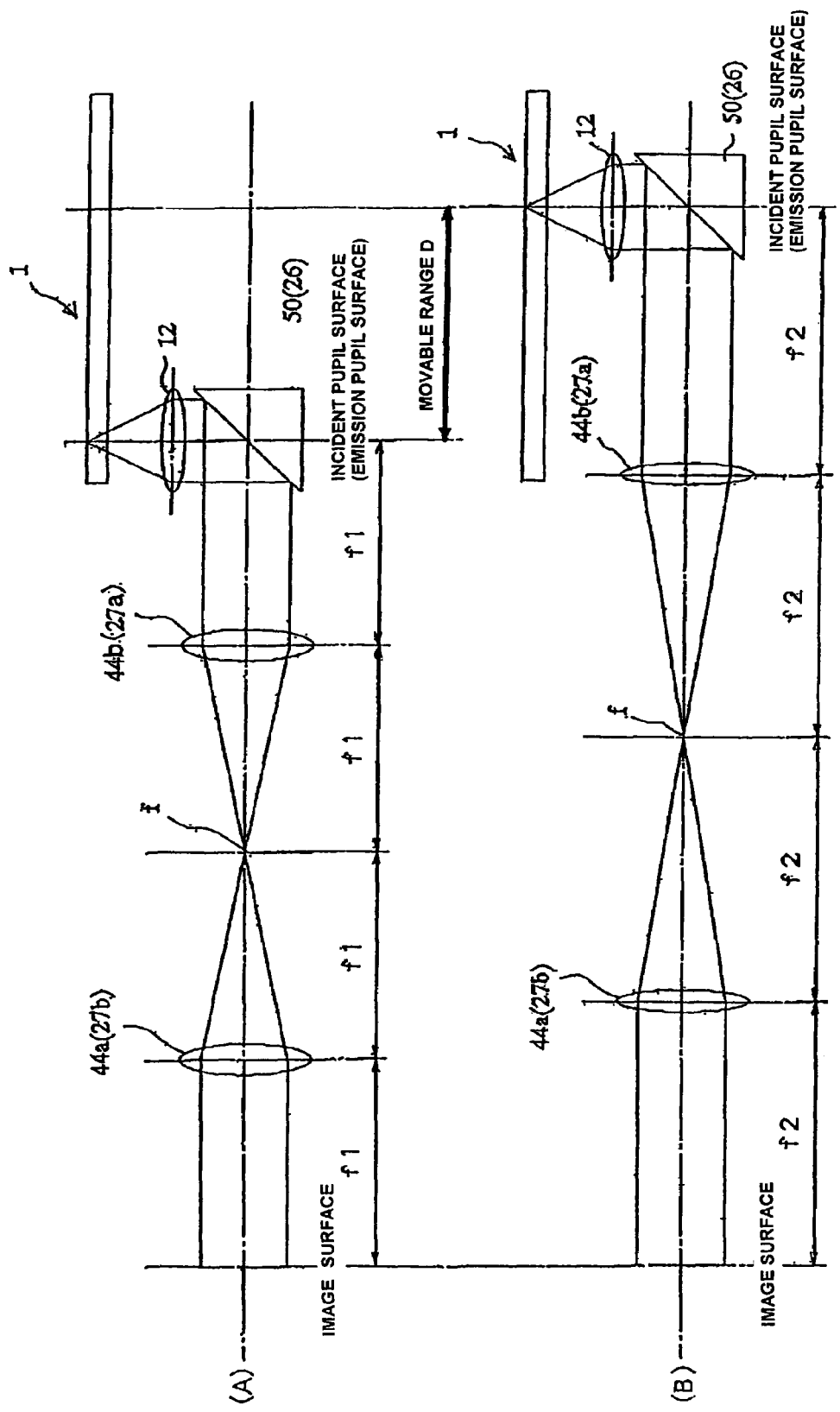
FIG. 5A is an illustration showing an optical system of the prior application on the outer periphery side of the optical information recording medium.
FIG. 5B is an illustration showing an optical system of the prior application on the inner periphery side.
Figure 6:
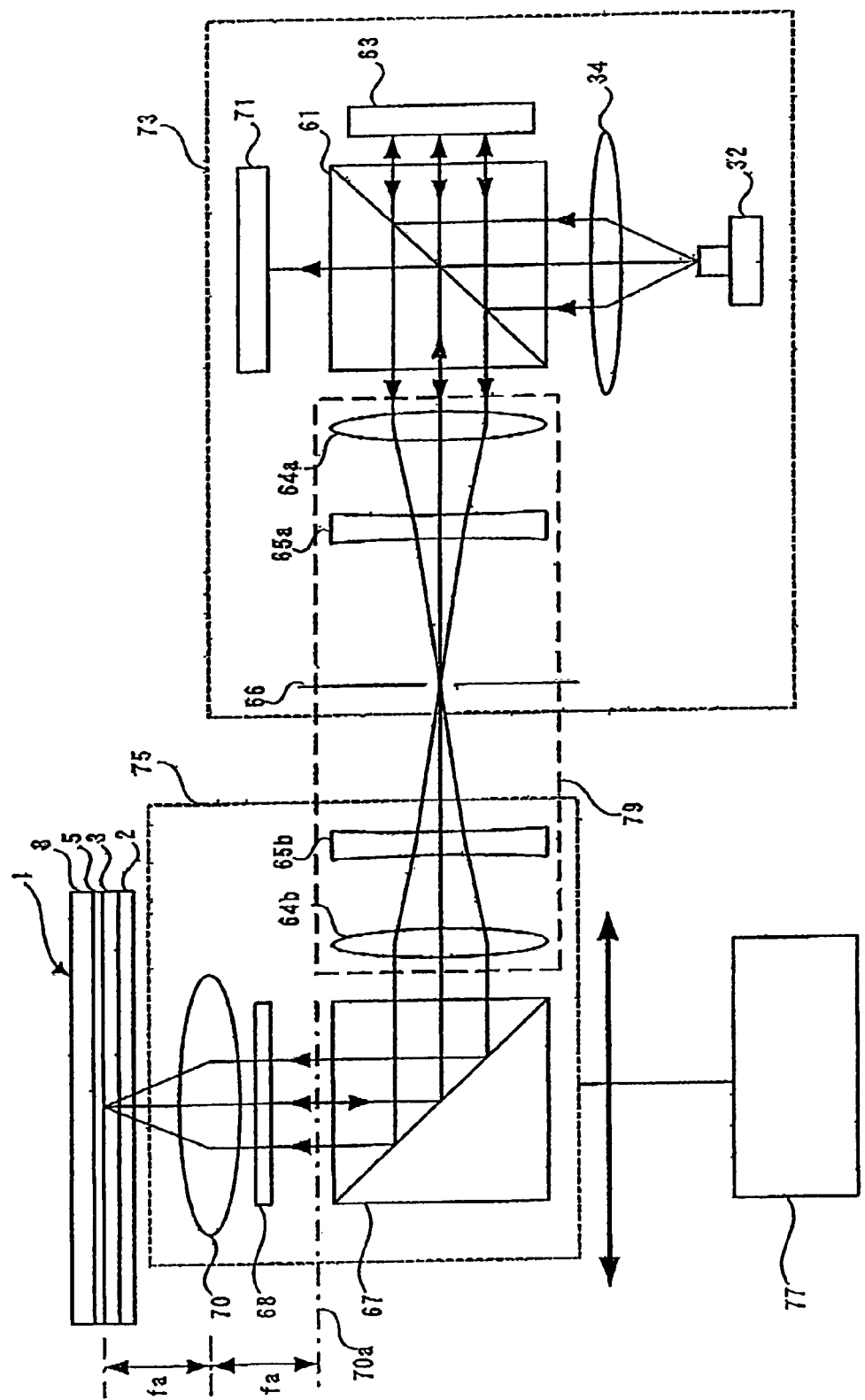
FIG. 6 is a schematic view showing an optical information recording/reproducing apparatus according to the embodiment of the present invention.

FIG. 6 shows an optical information recording/reproducing apparatus including an optical information recording apparatus according to the present invention. FIG. 1 shows an embodiment of a variable focal point optical system. Also, FIG. 2 shows the state of information recording and information reproduction on the outer peripheral side and the inner peripheral side of a disk-type optical information recording medium 1 as in FIGS. 5A and 5B described above. The optical recording medium 1 of the embodiment is the same as that of the conventional case so that the explanation will be omitted. As for the entire configuration of the optical information recording/reproducing apparatus according to the present invention, it is possible to use the same components as the ones show in FIG. 3 and FIG. 4 described above except for the lens system and the driving system.

As shown in FIG. 6, the optical information recording/reproducing apparatus of the present invention has: a light source 32; an information expressing device 63 which also serves as a reference light generator for generating information light by adding information onto the light from the light source 32; an objective lens 70 which irradiates the information light and the reference light onto the optical information recording medium 1 and to which the reproduction light generated from the optical information recording medium 1 enters; and an optical detector 71 for detecting the reproduction light, and comprises a fixed unit 73 and a moving unit 75.

As the light source 32, a semiconductor laser (blue laser) can be used. As the information expressing device 63, it is possible to use a transmission or reflection spatial light modulator having a number of pixels arranged in a matrix, which is capable of modulating the phase or/and intensity of the emitted light by each pixel. As the spatial light modulator, a DVD (digital micro mirror device) or a matrix liquid crystal device can be used. The DMD can modulate the intensity by changing the reflection direction of the incoming light by each pixel and spatially modulate the phase of the incoming light by changing the reflection position by each pixel. The liquid crystal device can spatially modulate the intensity and the phase of the incoming light by controlling the state of orientation of the liquid crystal by each pixel. For example, by setting the phase of the emitted light by each pixel to be either one of two values which differs by π radian, the phase of the light can be spatially modulated. The spatial light modulator, further, rotates the deflection direction of the emitted light by 90° with respect to the deflection direction of the incoming light.

The reference light generator is for generating the reference light. In FIG. 6, it is simultaneously generated with the information light by the information expressing device 63. As shown in FIG. 6, when the information light and the reference light are formed by one spatial light modulator, two regions may be provided in the spatial light modulator and the information light may be formed in one of the region and the reference light may be formed in the other region. Also, the reference light generator can be provided separately from the information expressing device 63. For example, another spatial light modulator may be provided for the reference light generator. In the optical information recording/reproducing apparatus shown in FIG. 3 and FIG. 4, a polarization beam splitter 36 for separating from the information light and a convex lens 56 for refracting the separated light serve as the reference light generating means. As the reference light, there are recording-specific reference light for forming holography by being interfered with the information light and reproduction-specific reference light for reproducing information from the recording-specific reference light and the holography.

The objective lens 70, at the time of recording, irradiates the information light and the reference light which have built an image on an incident pupil surface onto the optical information recording medium 1 to make them interfere in the information recording layer 3 for recording and, at the time of reproduction, irradiates the reference light which has built an image on the incident pupil surface onto the optical information recording medium 1 for building an image of the reproduction light generated from the optical information recording medium 1 on the emission pupil surface.

The optical detector 71 has a number of pixels arranged in a matrix for being able to detect the intensity of the received light by each pixel. As the optical detector 71, a CCD-type solid image pickup element or an MOS-type solid image pickup element can be used. Also, as the optical detector 71, a smart optical sensor (for example, see literature "O plus E, September, 1996, No. 202, pp. 93-99,") in which an MOS-type solid state image pickup element and a signal processing circuit are integrated on a single chip may be used. This smart optical sensor has a large transfer rate and a fast calculating function so that, by using the smart optical sensor, it is possible to achieve fast reproduction. For example, it is possible to perform reproduction at a transfer rate of, for example, in the order of G (giga) bit/second.

The fixed unit 73 includes at least the information expressing device 63 in the optical information recording apparatus and includes at least the optical detector 71 in the optical information reproducing apparatus. In addition, various optical elements may be included in the fixed unit 73. For example, in FIG. 6, the light source 32, a collimator lens 34, a polarization beam splitter 61, a convex lens 64a, a concave lens 65a and a diaphragm 66 are also included in the fixed unit 73. As will be described later, in a variable focal point optical system 79, some optical elements are movable for adjusting the focal point. However, they are not for making an access to a prescribed recording position of the optical information recording medium 1 so that the optical elements which are not included in the moving unit is a part of the fixed unit even if they are movable.

The moving unit 75 includes at least the objective lens 70 and moves for making access to a prescribed recording position of the optical information recording medium 1 by a driving device 77. In addition, various optical elements may be included in the moving unit 75. For example, in FIG. 6, a concave lens 65b, a convex lens 64b, a mirror 67 and a half-wave plate 68 are also included in the moving unit. However, it is preferable that the moving unit 75 be reduced in weight for achieving size-reduction and improving the transfer rate.

Further, in the optical information recording apparatus of the present invention, it is preferable to provide the variable focal point optical system 79 which can build an image in the position of the information expressing device 63 on the incident pupil surface 70a of the movable objective lens 70. As shown in FIG. 6, the distance from the center of the objective lens 70 to the incident pupil surface 70a and the distance from the center of the objective lens 70 to the focal point are the same focal distance fa.

Also, in the optical information reproducing apparatus, it is preferable to provide the variable focal point optical system which can build an image which is reproduced on the emission pupil surface 70a of the movable objective lens 70 in the position of the optical detector 71. As the variable focal point optical system 79, the ones with various configurations are made to be in practical use, for example, as a telephoto lens of a camera, a microscope and the like.

The driving device 77 can change the distance between the information expressing device 63 and the objective lens 75 and the distance between the optical detector 71 and the objective lens 63. In the embodiment shown in FIG. 6, the driving device 77 moves only the moving unit 75, however, it may drive the members other than the moving unit 75 as an embodiment shown in FIG. 7 which will be described later. As the driving device 77, it is possible to use the one which drives the pickup by a CD drive or a DVD drive.

The variable focal point optical system 79 is required to move the optical elements in the optical system and has a large number of components. Thus, it is preferable for lightening the weight of the moving unit 75 to dispose the entire variable focal point optical system in the fixed unit 73. However, the entire system may be disposed in the moving unit 75 or may be disposed partially in both the fixed unit 73 and the moving unit 75 as shown in FIG. 6.

Also, in the optical information recording/reproducing apparatus, required is a first variable focal point optical system for building the image in the position of the information expressing device 63 on the incident pupil surface 70a of the objective lens 70 and a second variable focal point optical system for building the image reproduced on the emission pupil surface 70a of the objective lens 70 in the position of the optical detector 71. It is preferable that at least a part of optical elements be used in common so that the optical information recording/reproducing apparatus can be reduced in size and the number of components can be reduced, thereby decreasing the manufacturing cost. Especially, as shown in FIG. 6, it is preferable to use one variable focal point optical system 79 as the first and second variable focal point optical systems.

In FIG. 6, the variable focal point optical system 79 is formed with a pair of convex lenses 64a, 64b and a pair of concave lenses 65a, 65b. The variable focal point optical system 79 with such a configuration will be described by referring to FIG. 1 and FIG. 2.

Figure 3:
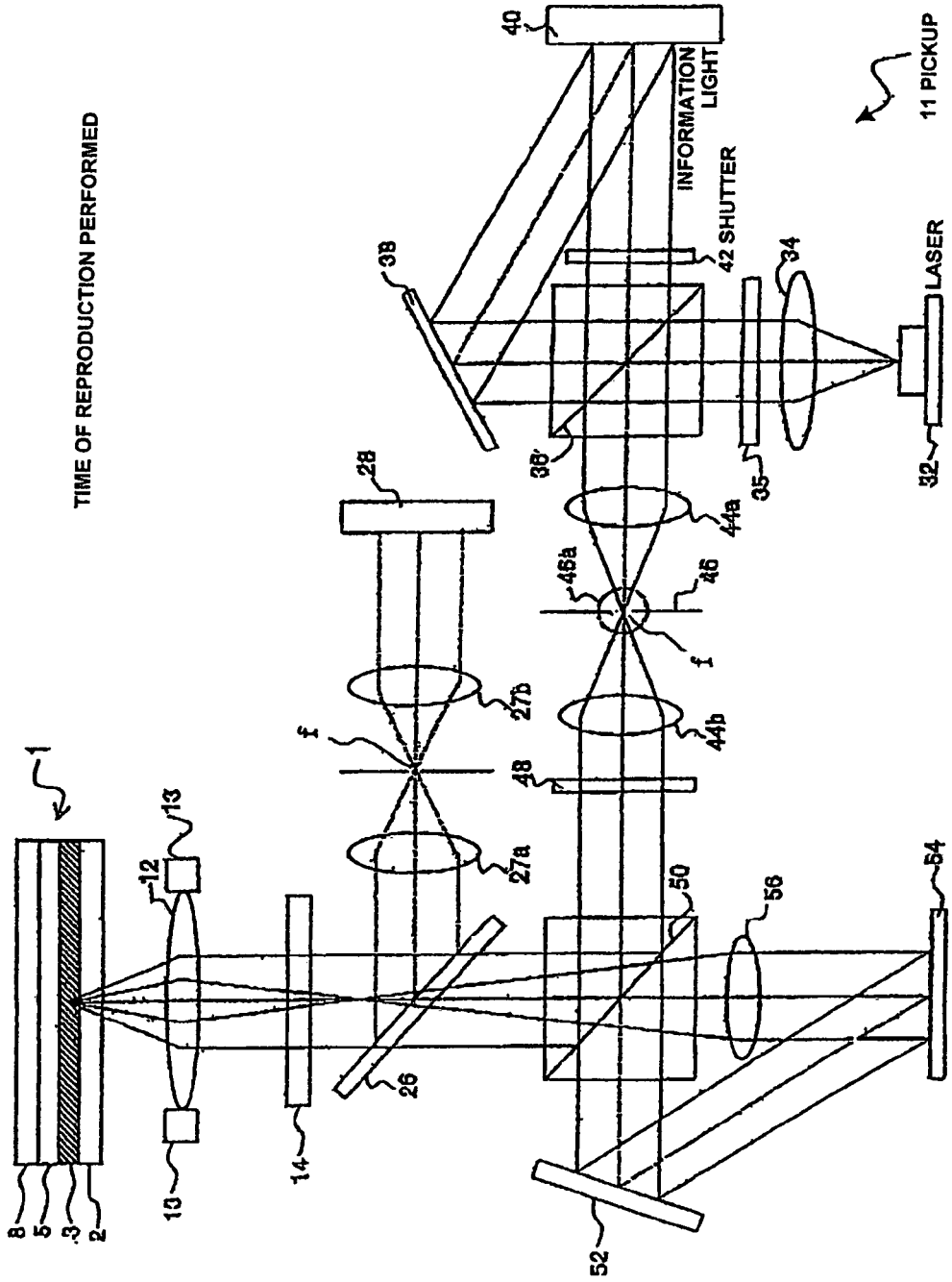
FIG. 3 is an illustration showing the state at the time of recording performed in an optical information recording/reproducing apparatus of the prior application.
Figure 4:
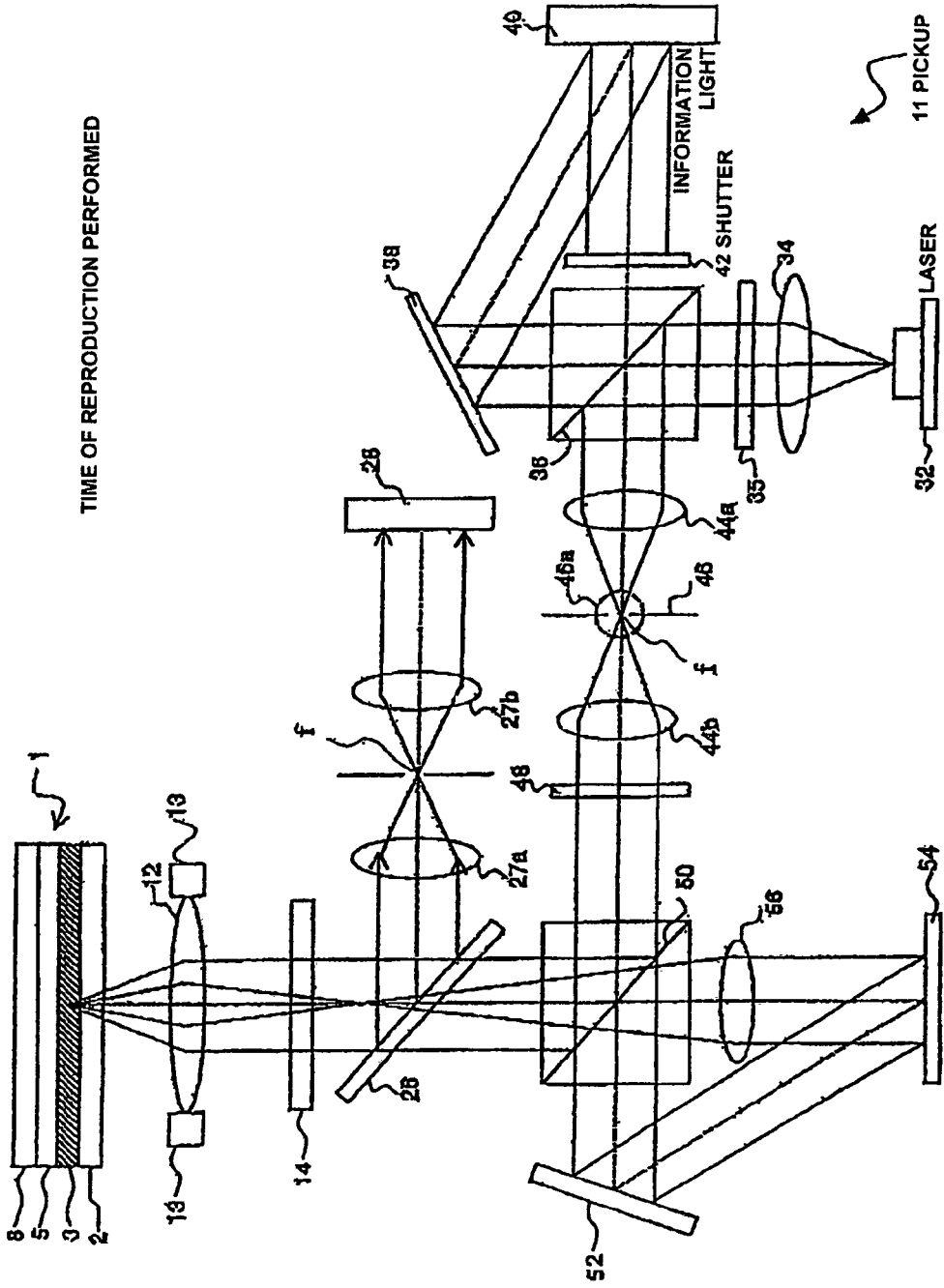
FIG. 4 is an illustration showing the state at the time of reproduction performed in an optical information recording/reproducing apparatus of the prior application.

In FIG. 1 and FIG. 2, the concave lenses 60a, 60b: 62a, 62b as the structural elements of the variable focal point optical system 79 are added to the optical system shown in FIG. 3 and FIG. 4. Since different relay lenses 44a, 44b: 27a, 27b and different half mirrors 50:26 are to be explained at the time of recording and reproduction, the terms and numerals for reproduction are mentioned after ": ", following the terms and numerals for recording. Also, in FIG. 1 and FIG. 2, the position of the information expressing device 63: the position of the optical detector 71 are shown as the image surfaces.

In FIG. 1 and FIG. 2, between a pair of convex lenses 44a, 44b: 27a, 27b disposed on the optical paths from the image surface, a pair of concave lenses 60a, 60b: 62a, 62b are provided by corresponding to the convex lenses 44a or 44b: 27a or 27b, which differ from each other.

Among them, the convex lenses 44a: 27b are fixed to be disposed and each of other lenses 44b, 60a, 60b: 27a, 62a, 62b is individually movable by a driving device such as a stepping motor or a transfer device such as a rack and pinion, which are not shown. When the diaphragm is disposed in the focal point f, the diaphragm is also formed to be movable.

Each of the lenses 44b, 60a, 60b: 27a, 62a, 62b, which is movable, respectively, obtains the distance f1 following that an objective lens 12, the half mirrors 50:26 and the like came to be in the position on the outer periphery side of the optical information recording medium 1 when information recording is performed on the outer periphery side of the optical information recording medium 1 shown in FIG. 2A or performing information reproduction from the outer periphery side, and the focal point f is to be in the intermediate position of both concave lenses 60a, 60b: 62a, 62b. At this time, the distances between the convex lenses 44a: 27b and the concave lenses 60a: 62b are defined as X.

Also, each of the lenses 44b, 60a, 60b: 27a, 62a, 62b, which is movable, respectively, is moved following that an objective lens 12, the half mirrors 50:26 and the like came to be in the position on the inner periphery side of the optical information recording medium 1 when information reproduction is performed on the inner periphery side of the optical information recording medium 1 shown in FIG. 2B or performing information reproduction from the inner periphery side. Each lens is synchronously moved so that the distance between the focal points on the inner side of the relay lenses becomes f3 while the distance between the image surface on the outer side of the relay lens and the convex lenses 44a: 27b and the distance between the convex lenses 44b: 27a and the incident pupil surface (emission pupil surface) stay the same as being f1. In FIG. 2B, the focal point f is to be in the intermediate position between both concave lenses 60a, 60b: 62a, 62b. At this time, the distances between the convex lenses 44a: 27b and the concave lenses 60a: 62b are defined as Y.

That is, by positioning the four lenses 44a, 44b, 60a, 60b: 27a, 27b, 62a, 62b to be plane symmetry with respect to the intermediate position of both concave lenses 60a, 60b: 62a, 62b, each of the lens systems of the embodiment has a zoom function within the range of a movable range D.

Also, in the vicinity of the optical information recording medium 1, provided is a sensor (not shown) such as a photo sensor for detecting the rotation state of the optical information recording medium, that is, oscillation and the decentralized state of the optical information recording medium 1. Further, also provided is a servo controller, not shown, to which a detection signal from the sensor is inputted for controlling the stepping motor which drives each of the lenses 44b, 60a, 60b: 27a, 62a, 62b. Therefore, when the servo controller slightly moves each of the lenses 44b, 60a, 60b: 27a, 62a, 62b, which is made movable by the signals of the rotation state of the optical recording medium being inputted from the sensor, information recording and information reproduction can be performed to/from the optical information recording medium 1 in accordance with the rotation state of the optical information recording medium 1.

As described above, in the embodiment, both the lens system formed with each of the lenses 44a, 44b, 60a, 60b and the lens system formed with each of the lenses 27a, 27b, 62a, 62b has the zoom function, so that information recording and information reproduction on the outer periphery side and the inner periphery side of the optical information recording medium 1 can all be performed to have uniform and excellent quality.

Also, since there is the servo controller for servo-controlling the rotation state of the optical recording medium 1, each of the lenses 44b, 60a, 60b: 27a, 62a, 62b can be slightly moved according to the rotation state of the optical information recording medium 1 so as to perform information recording or information reproduction to/from the optical information recording medium 1 according to the rotation state of the optical information recording medium 1.

Figure 7:
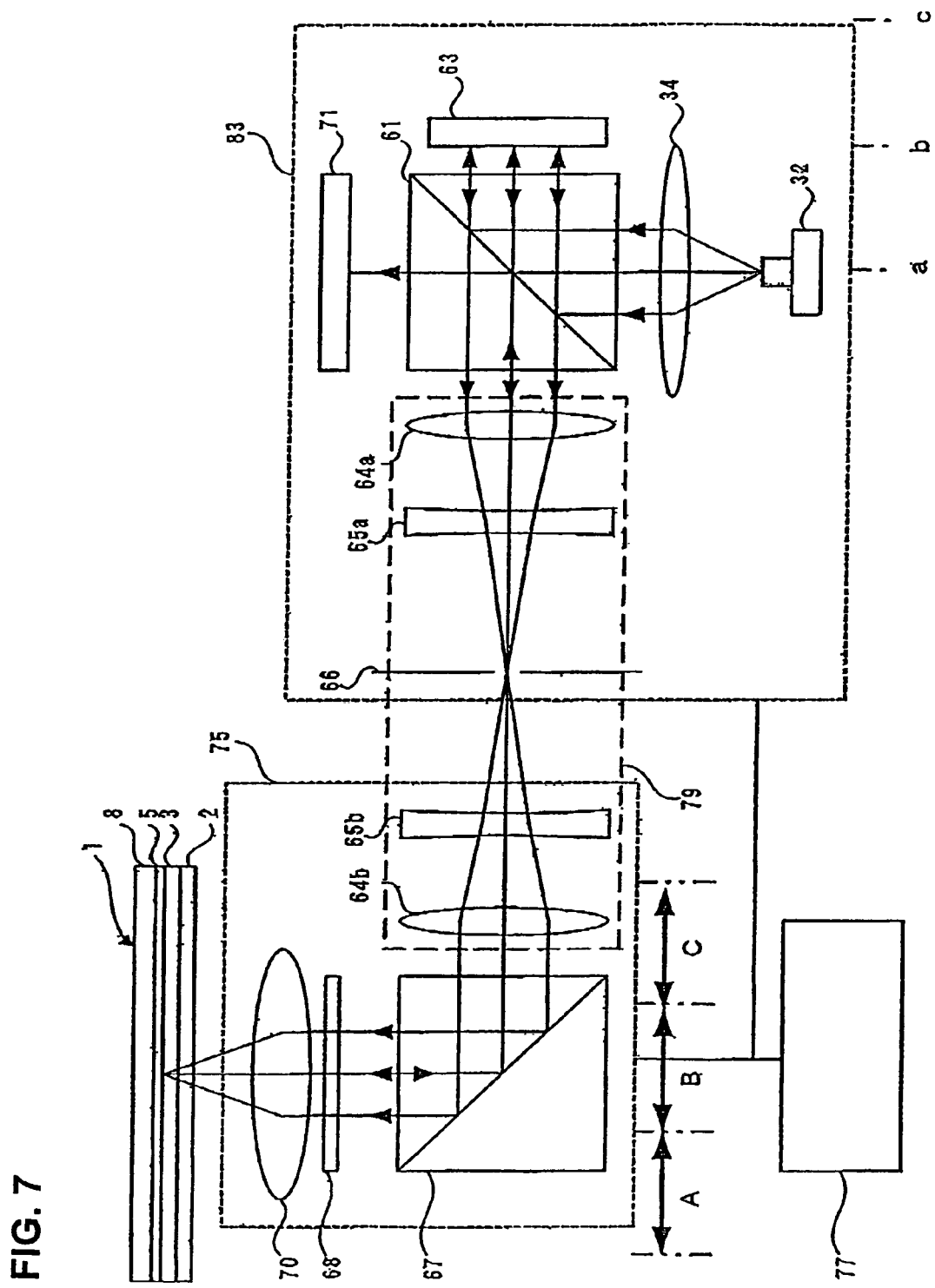
FIG. 7 is a schematic view showing an optical information recording/reproducing apparatus according to another embodiment of the present invention.

As another embodiment, as shown in FIG. 7, a section 83 corresponding to the fixed unit shown in FIG. 6 may not be completely fixed but may be moved according to the recording position or the reproducing position of the moving unit 75 in the recording medium. For example, in FIG. 7, the section 83 may be so moved by the driving device 77 that the information expressing device 63 comes to be in position a while the moving unit 75 is in the region A, that the information expressing device 63 comes to be in position b while the moving unit 75 is in the region B, and that the information expressing device 63 comes to be in position c while the moving unit 75 is in the region C. In this case, also, the distance between the expressing device 63 or the optical detector 71 and the objective lens 70 changes so that it is preferable to adjust the focal point by the variable focal point optical system 79.

The present invention is not limited to the above-described embodiments and various modifications are possible as necessary. For example, the arrangements of the fixing position and the movable position of each lens forming the lens system are not limited to the above-described embodiments but various modifications are possible. Further, various configurations of the convex lens and the concave lens which form the lens system are possible. Furthermore, as the optical information recording medium 1, it is not limited to the disk type but various shapes such as a card type can be employed.

What is claimed is:

1. An optical information recording apparatus using holography, having: a light source; an information expressing means for generating information light by adding information to light from said light source; a reference light generating means for generating reference light from the light from said light source; and an objective lens for irradiating said information light and said reference light onto an optical information recording medium, characterized in that the apparatus comprises:
   a fixed unit including at least said information expressing means,
   a moving unit including at least said objective lens which moves for making access to a prescribed recording position of said optical information recording medium, and
   a variable focal point optical system which is capable of building an image in a position of said information expressing means on an incident pupil surface of said movable objective lens.

2. The optical information recording apparatus according to claim 1, characterized in that the entire part of said variable focal point optical system is placed in said fixed unit.

3. An optical information recording apparatus using holography, having: a light source; an information expressing means for generating information light by adding information to light from said light source; a reference light generating means for generating reference light from the light from said light source; and an objective lens for irradiating said information light and said reference light onto an optical information recording medium, characterized in that the apparatus comprises:
   a driving means for changing a distance between said information expressing means and said objective lens; and
   a variable focal point optical system which is capable of building an image in a position of said information expressing means on an incident pupil surface of said objective lens even when the distance between said information expressing means and said objective lens is changed by said driving means.

4. The optical information recording apparatus according to claim 3, characterized in that a servo control means for servo-controlling said variable focal point optical system according to rotation state of said optical information recording medium is provided.

5. An optical information reproducing apparatus using holography, having: a light source; a reference light generating means for generating reference light from the light from said light source; and an objective lens which irradiates said reference light onto an optical information recording medium and to which reproduction light generated from said optical information recording medium enters; and an optical detector for detecting said reproduction light, characterized in that the apparatus comprises:
   a fixed unit including at least said optical detector,
   a moving unit including at least said objective lens which moves for making access to a prescribed reproducing position of said optical information recording medium, and
   a variable focal point optical system which is capable of building an image reproduced on an emission pupil surface of said movable objective lens in a position of said optical detector is provided.

6. The optical information reproducing apparatus according to claim 5, characterized in that the entire part of said variable focal point optical system is placed in said fixed unit.

7. An optical information reproducing apparatus using holography, having: a light source; a reference light generating means for generating reference light from the light from said light source; and an objective lens which irradiates said reference light onto an optical information recording medium and to which reproduction light generated from said optical information recording medium enters; and an optical detector for detecting said reproduction light, characterized in that the apparatus comprises:
   a driving means for changing a distance between said objective lens and said optical detector; and
   a variable focal point optical system which is capable of building an image reproduced on an emission pupil surface of said objective lens in a position of said optical detector even when the distance between said objective lens and said optical detector is changed by said driving means.

8. The optical information recording apparatus according to claim 7, characterized in that a servo control for servo-controlling said variable focal point optical system according to rotation state of said optical information recording medium is provided.

9. An optical information recording/reproducing apparatus using holography, having: a light source; an information expressing means for generating information light by adding information to light from said light source; a reference light generating means for generating reference light from the light from said light source; an objective lens which irradiates said information light and said reference light onto an optical information recording medium and to which reproduction light generated from said optical information recording medium enters; and an optical detector for detecting said reproduction light, characterized in that the apparatus comprises:

- a fixed unit including at least said information expressing means and said optical detectors,
- a moving unit including at least said objective lens which moves for making access to a prescribed recording position and reproducing position of said optical information recording medium,
- a first variable focal point optical system which is capable of building an image of a position of said information expressing means on an incident pupil surface of said movable objective lens, and
- a second variable focal point optical system which can build an image reproduced on an emission pupil surface of said movable objective lens in a position of said optical detector are provided.

10. The optical information recording/reproducing apparatus according to claim 9 characterized in that the entire part of said first and second variable focal point optical systems is placed in said fixed unit.

11. An optical information recording/reproducing apparatus using holography, having: a light source; an information expressing means for generating information light by adding information to light from said light source; a reference light generating means for generating reference light from the light from said light source; an objective lens which irradiates said information light and said reference light onto an optical information recording medium and to which reproduction light generated from said optical information recording medium enters; and an optical detector for detecting said reproduction light, characterized in that the apparatus comprises:

- a driving means for changing a distance between said information expressing means and said objective lens and a distance between said optical detector and said objective lens;
- a first variable focal point optical system which is capable of building an image in an position of said information expressing means on an incident pupil surface of said movable objective lens even when the distance between said information expressing means and objective lens is changed by said driving means;
- and a second variable focal point optical system which is capable of building an image reproduced on an emission pupil surface of said objective lens in a position of said optical detector even when the distance between said objective lens and said optical detector is changed by said driving means.

12. The optical information recording/reproducing apparatus according to claim 11, characterized in that a servo control means for servo-controlling said first and second variable focal point optical systems according to rotation state of said optical information recording medium is provided.

13. The optical information recording/reproducing apparatus according to claim 11 or claim 12, characterized in that at least a part of said first and second variable focal point optical systems is to be used in common.

* * * * *